F. J. T. O'BRIEN.
GRIDDLE.
APPLICATION FILED OCT. 14, 1919.
1,391,268. Patented Sept. 20, 1921.
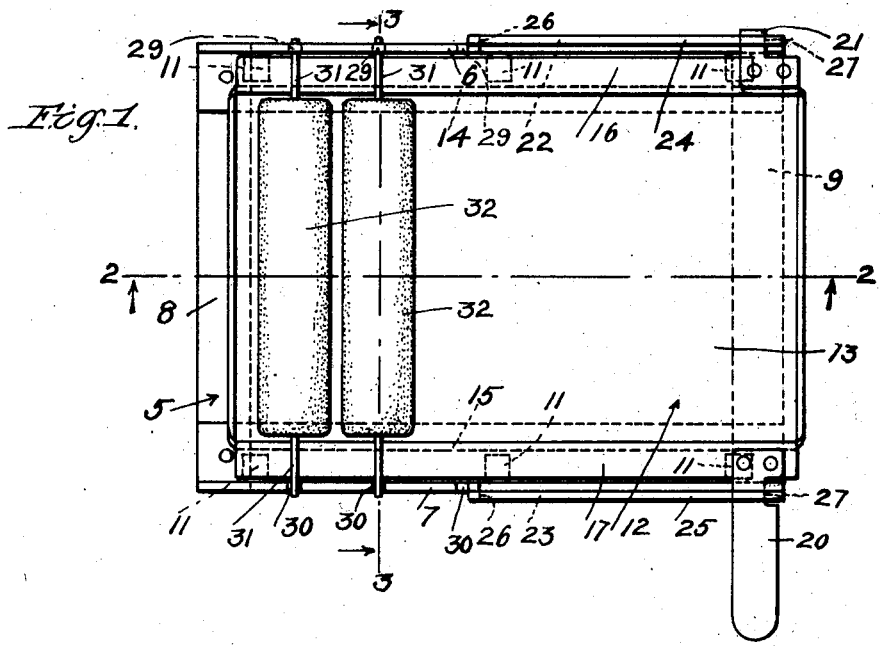
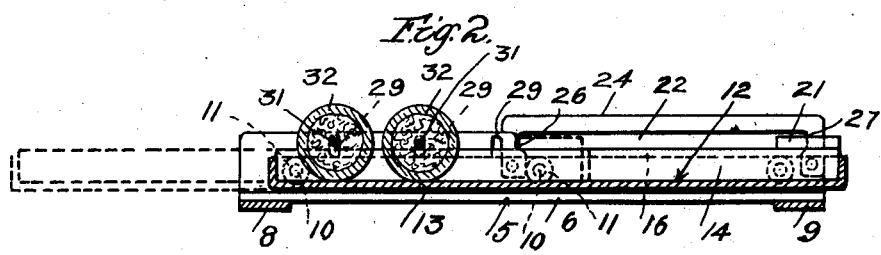
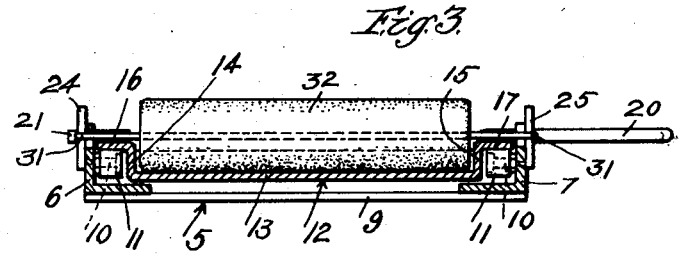
INVENTOR
Francis J. T. O'Brien
ATTORNEY

UNITED STATES PATENT OFFICE.

FRANCIS J. T. O'BRIEN, OF LOS ANGELES, CALIFORNIA.

GRIDDLE.

1,391,268.                Specification of Letters Patent.        Patented Sept. 20, 1921.

Application filed October 14, 1919. Serial No. 330,631.

*To all whom it may concern:*

Be it known that I, FRANCIS J. T. O'BRIEN, a citizen of the United States, residing at Los Angeles, in the county of Los Angeles, State of California, have invented new and useful Improvements in Griddles, of which the following is a specification.

My invention relates to that class of cooking utensils commonly known as griddles, and is particularly adapted to be used for the frying of food products which are cylindrical in form.

In the frying of food products of a cylindrical nature, such for instance as a product formed of a cylindrical shell of dough having a filling of chopped meat, oysters, or the various kinds of jams and jellies, it has heretofore been found difficult to fry such product uniformly, due to its peculiar shape.

It is an object of my invention to overcome the above mentioned difficulty, by providing a utensil which is adapted to conveniently and readily shift the cylindrical food product from time to time, so as to present its entire peripheral surface, as well as its end surfaces progressively to the heated surface of the griddle, whereby the entire surface of the article will be presented to the heated surface of the griddle, and thus produce a finished product whose entire surface is uniformly cooked.

Other objects will appear in the following description, will be pointed out in the claims, and embodied in the accompanying drawings, in which:

Figure 1 is a plan view of my utensil, showing a plurality of food products mounted thereon ready to be cooked.

Fig. 2 is a longitudinal section through the same, taken on the line 2—2 of Fig. 1, viewed in the direction indicated by the arrows.

Fig. 3 is a transverse section through the same, taken on the line 3—3 of Fig. 1, viewed in the direction indicated by the arrows.

In carrying out my invention I provide a rectangular frame 5, comprising a pair of angle irons 6 and 7, spaced a suitable distance apart in parallel relation, and held in such relation by means of the transverse pieces of strap metal 8 and 9, which are riveted or otherwise secured thereto, as clearly shown in the various figures of the drawing.

The upstanding flanges of angle irons 6 and 7 have projecting inwardly therefrom a plurality of oppositely disposed studs 10, upon which are mounted for rotation the antifrictional rollers 11, adapted to support a metallic pan 12. The bottom 13 of the pan 12 projects down into the frame 5, and is provided with the upstanding sides 14 and 15 which are bent at right angles to form the horizontally disposed flanges 16 and 17, which rest upon the rollers 11.

By this construction it is obvious that the pan 11 may be readily and easily slid with relation to frame 5, and in order that pan 12 may be conveniently moved back and forth and limited in said movement in both directions, I provide the bar 20 which is riveted to the flange 17, and serves both as a handle and a stop, and the stop lug 21, which is riveted to flange 16. The bar 20 and stop lug 21 are adapted to project through slots 22 and 23 formed between the top edges of the upstanding flanges of members 6 and 7, and bars 24 and 25, which are respectively riveted to said flanges, and are turned downwardly at their respective ends for this purpose, thus forming abutments 26 and 27, against which the stop lug 21 and handle bar 20 are adapted to abut, to limit the movement of pan 12. By this arrangement the frame 5 and pan 12 are held against displacement.

The upstanding flange of angle iron 6 is provided with a plurality of vertically disposed slots 29 spaced suitably apart and the upwardly projecting flange of iron 7 is provided with a plurality of notches 30, which are disposed opposite to slots 29. These slots 29 and notches 30 are arranged in their respective angle irons adjacent the ends thereof, and are adapted to receive the spindles 31, which comprise a piece of wire which is passed through the axial center of the food product 32, the peripheral surface of which rests upon the bottom 13 of pan 12. By this arrangement it is obvious that when the pan 12 is moved, the food products 32 will rotate by frictional contact with the bottom of said pan, but will be held against longitudinal movement with respect to frame 5 by the slots and grooves 29 and 30.

In operating my utensil, the food products are first placed in pan 12 in the manner above described, the frame 5 is then placed over the fire box of the stove or the burner of a gas range in such manner as to permit the pan 12 to be exposed to the heat. The handle 20 may then be moved backward and forward at the discretion of the cook, thereby rotating the food products, to expose their peripheral surfaces to contact with the heated bottom of the pan, thus providing a means whereby the cook may produce an evenly and uniformly fried product.

The upstanding sides 14 and 15 of pan 12 also become heated and as the ends of the food product rest adjacent these sides, it is obvious that these ends likewise become uniformly cooked.

Although I have illustrated and described my invention as being operated by hand, it is apparent that the pan 12 may be moved by means of a motor of any desired type and at any predetermined speed, thereby gradually frying the product uniformly on all of its surfaces.

What I claim is:

1. A griddle adapted to be placed adjacent a heating unit provided with means for supporting a food product of cylindrical formation, and means independent of said supporting means for rotating said food product.

2. A griddle, comprising a frame, a plate adapted to move on said frame and means arranged on said frame for supporting a food product of cylindrical formation, whereby the peripheral surface of said food product will rest upon said plate.

3. A griddle, comprising a frame, a plate provided with upwardly extending sides adapted to reciprocate on said frame, and means arranged on said frame for supporting a food product of cylindrical formation, whereby the peripheral surface of said food product will rest upon said plate and the ends of said food product will rest adjacent said upwardly extending sides.

4. A griddle, comprising a frame, provided with upwardly extending sides having oppositely disposed apertures or slots therein, adapted to receive the ends of spindles upon which a cylindrical food product is mounted, a plate mounted to reciprocate on guideways on said frame and means for reciprocating said plate.

5. A griddle construction, comprising a frame having means for rotatably supporting a food product of cylindrical formation, and a food supporting plate movably mounted on said frame, whereby on a movement of said plate the cylindrical food products will be rotated.

6. In combination with a heated surface for cooking articles of food in contact therewith, means for bodily and rotatively moving said articles of food relatively to said heated surfaces.

In witness that I claim the foregoing I have hereunto subscribed my name this 25 day of September, 1919.

FRANCIS J. T. O'BRIEN.